(12) United States Patent
Gao et al.

(10) Patent No.: US 10,810,748 B2
(45) Date of Patent: Oct. 20, 2020

(54) MULTIPLE TARGETS—TRACKING METHOD AND APPARATUS, DEVICE AND STORAGE MEDIUM

(71) Applicant: BAIDU ONLINE NETWORK TECHNOLOGY (BEIJING) CO., LTD., Haidian District, Beijing (CN)

(72) Inventors: Han Gao, Beijing (CN); Ji Wan, Beijing (CN); Tian Xia, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 177 days.

(21) Appl. No.: 16/012,569

(22) Filed: Jun. 19, 2018

(65) Prior Publication Data

US 2019/0005657 A1   Jan. 3, 2019

(30) Foreign Application Priority Data

Jun. 30, 2017   (CN) .......................... 2017 1 0521291

(51) Int. Cl.
| | |
|---|---|
| *G06K 9/62* | (2006.01) |
| *G06K 9/00* | (2006.01) |
| *G06N 3/04* | (2006.01) |
| *G06T 7/246* | (2017.01) |
| *G06K 9/46* | (2006.01) |
| *G06N 5/04* | (2006.01) |

(Continued)

(52) U.S. Cl.
CPC .............. *G06T 7/251* (2017.01); *G06F 17/16* (2013.01); *G06K 9/00295* (2013.01); *G06K 9/2054* (2013.01); *G06K 9/46* (2013.01); *G06K 9/6212* (2013.01); *G06K 9/6215* (2013.01); *G06N 3/0454* (2013.01); *G06N 3/08* (2013.01); *G06N 5/046* (2013.01); *G06T 7/11* (2017.01); *G06T 7/246* (2017.01); *G06T 7/97* (2017.01); *G06T 2207/10016* (2013.01); *G06T 2207/20081* (2013.01); *G06T 2207/20084* (2013.01)

(58) Field of Classification Search
CPC ............ G06N 3/08; G06T 2207/20081; G06K 9/6268; G06K 9/00805
See application file for complete search history.

(56) References Cited

U.S. PATENT DOCUMENTS

| | | | |
|---|---|---|---|
| 9,396,415 B2 * | 7/2016 | Chertok | ................... G06N 3/02 |
| 10,204,264 B1 * | 2/2019 | Gallagher | ........ H04N 21/44218 |

(Continued)

*Primary Examiner* — King Y Poon
*Assistant Examiner* — Michael Burleson
(74) *Attorney, Agent, or Firm* — Brooks Kushman PC

(57) ABSTRACT

The present disclosure provides a multiple targets-tracking method and apparatus, a device and a storage medium, wherein the method comprises: obtaining a to-be-processed current image, inputting the current image into a convolutional neural network model obtained by pre-training, and obtaining a target detection result; respectively extracting feature vectors of each detected target from a pre-selected convolutional layer; respectively calculating a similarity between the feature vectors of each target in the current image and feature vectors of each target of previous images, completing association of the same target between different image frames according to calculation results, and allocating a tracking serial number. The solution of the present disclosure may be applied to meet requirements for real-time processing.

18 Claims, 2 Drawing Sheets

(51) Int. Cl.
*G06T 7/00* (2017.01)
*G06N 3/08* (2006.01)
*G06K 9/20* (2006.01)
*G06F 17/16* (2006.01)
*G06T 7/11* (2017.01)

(56) References Cited

U.S. PATENT DOCUMENTS

2016/0210536 A1* 7/2016 Cho .......................... G06K 9/78
2017/0262695 A1* 9/2017 Ahmed .............. G06K 9/00288
2018/0150956 A1* 5/2018 Kao .......................... G06T 7/11

* cited by examiner ons
MULTIPLE TARGETS—TRACKING METHOD AND APPARATUS, DEVICE AND STORAGE MEDIUM The present application claims the priority of Chinese Patent Application No. 2017105212912, filed on Jun. 30, 2017, with the title of "Multiple targets-tracking method and apparatus, device and storage medium". The disclosure of the above applications is incorporated herein by reference in its entirety.

FIELD OF THE DISCLOSURE

The present disclosure relates to computer application technologies, and particularly to a multiple targets-tracking method and apparatus, a device and a storage medium.

BACKGROUND OF THE DISCLOSURE

Visual multiple targets-tracking is one of key techniques of visual obstacle detection, and its main function is to allocate the same serial number to the same target in continuous image frames to estimate a movement trajectory of each target.

A tracking algorithm usually employs the manner Tracking by Detection, i.e., the tracking procedure greatly depends on detection results. An implementation flow mainly comprises: performing target detection, performing data association of inter-frame detection results, and allocating serial numbers for targets.

The performance of data association, as an important link in the tracking procedure, directly affects the level of the tracking quality, and a data association speed directly affects whether the tracking algorithm can become a real-time online algorithm.

Data association operations usually comprise: performing feature extraction for target detection results, using extracted features to calculate similarity between different targets, and then solving the allocation problem, namely, using a similarity matrix of respective targets to find optimal allocation and thereby completing target association.

A commonly-used feature extraction manner is extracting optical flow features, for example Scale Invariant Feature Transform (SIFT) features, extracting multiple features with respect to each detected target to form feature vectors, and thereby calculating a cosine similarity between feature vectors.

Although a good tracking effect is achieve in the aforesaid manner, a calculating speed is slower when better features are described. For example, SIFT features have a very strong description capability, but the procedure of extracting the SIFT features is very time-consuming and therefore cannot meet requirements for real-time processing in multiple targets-tracking.

SUMMARY OF THE DISCLOSURE

In view of the above, the present disclosure provides a multiple targets-tracking method and apparatus, a device and a storage medium, which can satisfy requirements for real-time processing.

Specific technical solutions are as follows:

A multiple targets-tracking method, comprising:

obtaining a to-be-processed current image, inputting the current image into a convolutional neural network model obtained by pre-training, and obtaining a target detection result;

respectively extracting feature vectors of each detected target from a pre-selected convolutional layer;

respectively calculating a similarity between the feature vectors of each target in the current image and feature vectors of each target of previous images, completing association of the same target between different image frames according to calculation results, and allocating a tracking serial number.

According to a preferred embodiment of the present disclosure, the obtaining a to-be-processed current image, inputting the current image into a convolutional neural network model obtained by pre-training, and obtaining a target detection result further comprises:

obtaining images as training data, and respectively obtaining a notation result of each target in each frame of images as the training data;

obtaining the convolutional neural network model by training according to the images as the training data and the notation results of respective targets therein.

According to a preferred embodiment of the present disclosure, the extracting feature vectors of each detected target from a pre-selected convolutional layer comprises:

respectively performing the following processing for each detected target:

finding a corresponding area of the target in the selected convolutional layer;

extracting a convolutional feature corresponding to the area in a roi pooling manner;

normalizing the extracted convolutional feature to obtain the feature vectors of the target.

According to a preferred embodiment of the present disclosure, the respectively calculating a similarity between the feature vectors of each target in the current image and feature vectors of each target of previous images comprises:

with respect to each detected target, respectively calculating the similarity between the feature vectors of the target and feature vectors of each target in previous images according to a similarity estimating model obtained by pre-training.

According to a preferred embodiment of the present disclosure, before obtaining the to-be-processed current image, inputting the current image into the convolutional neural network model obtained by pre-training, and obtaining the target detection result, the method further comprises:

obtaining respective targets as the training data and corresponding feature vectors;

obtaining the similarity estimating model by training according to a principle that a similarity between feature vectors from the same target is larger than a similarity between feature vectors from different targets.

According to a preferred embodiment of the present disclosure, the similarity estimating model is:

similarity$(x,z)=x^T \theta z$, wherein x and z respectively represent two feature vectors;

$\theta$ represents a similarity parameter obtained from the training;

similarity$(x,z)$ represents the similarity resulting from the calculation.

A multiple targets-tracking apparatus, comprising: a first tracking unit and a second tracking unit;

the first tracking unit is configured to obtain a to-be-processed current image, input the current image into a convolutional neural network model obtained by pre-training, and obtain a target detection result;

the second tracking unit is configured to respectively extract feature vectors of each detected target from a pre-selected convolutional layer, respectively calculate a similarity between the feature vectors of each target in the current image and feature vectors of each target of previous images, complete association of the same target between different image frames according to calculation results, and allocate a tracking serial number.

According to a preferred embodiment of the present disclosure, the apparatus further comprises: a first pre-processing unit;

the first pre-processing unit is configured to obtain images as training data, and respectively obtain a notation result of each target in each frame of images as the training data, and obtain the convolutional neural network model by training according to images as the training data and the notation results of respective targets therein.

According to a preferred embodiment of the present disclosure, the second tracking unit respectively performs the following processing for each detected target:

finding a corresponding area of the target in the selected convolutional layer;

extracting a convolutional feature corresponding to the area in a roi pooling manner;

normalizing the extracted convolutional feature to obtain the feature vectors of the target.

According to a preferred embodiment of the present disclosure, the second tracking unit, with respect to each detected target, respectively calculates the similarity between the feature vectors of the target and feature vectors of each target in previous images according to a similarity estimating model obtained by pre-training.

According to a preferred embodiment of the present disclosure, the apparatus further comprises: a second pre-processing unit;

the second pre-processing unit is configured to obtain respective targets as the training data and corresponding feature vectors, and obtain a similarity estimating model by training according to a principle that a similarity between feature vectors from the same target is larger than a similarity between feature vectors from different targets.

According to a preferred embodiment of the present disclosure, the similarity estimating model is:

similarity$(x,z)=x^T \theta z$, wherein x and z respectively represent two feature vectors;

θ represents a similarity parameter obtained from the training;

similarity(x,z) represents the similarity resulting from the calculation.

A computer device, comprising a memory, a processor and a computer program which is stored on the memory and runs on the processor, the processor, upon executing the program, implementing the above-mentioned method.

A computer-readable storage medium on which a computer program is stored, the program, when executed by the processor, implementing the aforesaid method.

As can be seen from the above introduction, according to solutions of the present disclosure, pre-training may be performed to obtain the convolutional neural network model and the similarity estimating model so that after the to-be-processed current image is obtained, the current image may be input into the convolutional neural network model to obtain the target detection result, then the feature vectors of respective detected targets may be respectively extracted from the pre-selected convolutional layer, and the similarity between the feature vectors of respective targets in the current image and feature vectors of targets in previous images according to the similarity estimating model is respectively calculated, thereby completing association of the same target between different image frames according to the calculation result, and allocating a tracking serial number. As compared with the prior art, in the solutions of the present disclosure, the convolutional feature in the convolutional neural network is used as the feature of the target, the desired feature may be obtained correspondingly upon completion of the detection, thereby saving time spent in extracting the feature again, substantially improving the processing speed and thereby satisfying requirements for real-time processing in multiple targets-tracking.

DETAILED DESCRIPTION OF PREFERRED EMBODIMENTS

Technical solutions of the present disclosure will be described in more detail in conjunction with figures and embodiments to make technical solutions of the present disclosure clear and more apparent.

Obviously, the described embodiments are partial embodiments of the present disclosure, not all embodiments. Based on embodiments in the present disclosure, all other embodiments obtained by those having ordinary skill in the art without making inventive efforts all fall within the protection scope of the present disclosure.

Figure 1:
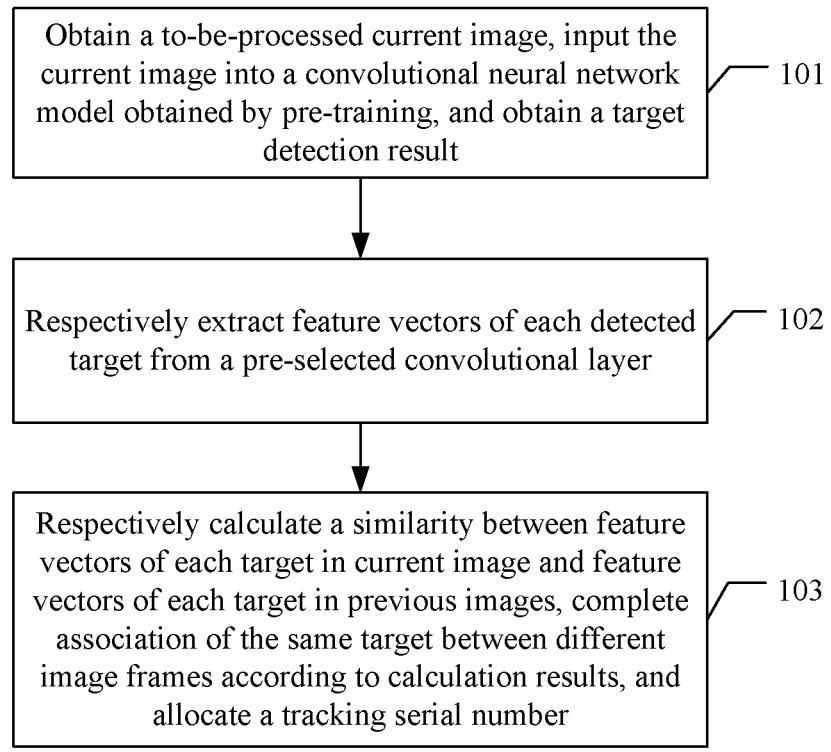
FIG. 1 is a flow chart of an embodiment of a multiple targets-tracking method according to the present disclosure.

FIG. 1 is a flow chart of an embodiment of a multiple targets-tracking method according to the present disclosure. As shown in FIG. 1, the embodiment comprises the following specific implementation mode.

101 relates to obtaining a to-be-processed current image, inputting the current image into a convolutional neural network model obtained by pre-training, and obtaining a target detection result;

102 relates to respectively extracting feature vectors of each detected target from a pre-selected convolutional layer;

103 relates to respectively calculating a similarity between the feature vectors of each target in the current image and feature vectors of each target of previous images, completing association of the same target between different image frames according to calculation results, and allocating a tracking serial number.

It can be seen that to implement the above-mentioned solution, pre-training needs to be performed to obtain a convolutional neural network model so that after the to-be-processed current image is obtained, the convolutional neural network model may be used to perform target detection for the current image to thereby obtain the target detection result.

After the target detection result is obtained, the feature vectors of each detected target may be respectively generated according to the features of the selected convolutional layer.

Furthermore, it is feasible to respectively calculate a similarity between the feature vectors of each detected target and feature vectors of each target of previous images, then complete association of the same target between different image frames according to the prior art, and allocating a tracking serial number.

A similarity estimating model may be obtained by pre-training, to better estimate the similarity between different feature vectors.

Specific implementations of each of the above-mentioned portions are described respectively in detail.

1) Convolutional Neural Network Model

Training data need to be obtained first to obtain the convolutional neural network model.

For example, it is feasible to obtain images as training data, and respectively obtain a notation result of each target in each frame of images as the training data.

The notation result of each target may be a manually-notated result or a machine-notated result, which is not limited here.

Then, the convolutional neural network model is obtained by training according to images as training data and the notation results of respective targets therein.

2) Target Detection

After the convolutional neural network model is obtained by training, the model may be used to perform actual target detection.

The performing actual target detection is obtaining the to-be-processed current image, inputting the current image into the convolutional neural network model, and thereby obtaining the target detection result output by the convolutional neural network model, for example, using a detection box to demarcate each detected target.

The detection procedure based on the convolutional neural network model may be considered as a deep network first extracting features capable of better distinguishing targets, and then using these features to distinguish targets. Hence, each convolutional layer in the convolutional neural network may be considered as a feature, wherein the feature of a layer closer to the input image includes more information of the image itself, and the feature of a layer closer to an output result includes more abstract information.

3) Feature Vector Generation

After the target detection result of the current image is obtained according to the convolutional neural network model, the feature vectors of each detected target may be respectively extracted from a pre-selected convolutional layer.

Specifically, the following processing may be performed for each detected target: finding a corresponding area of the target in the selected convolutional layer; extracting a convolutional feature corresponding to the area in a roi pooling manner; normalizing the extracted convolutional feature to obtain the feature vectors of the target.

How to obtain the selected convolutional layer may depends on actual situations, for example, upon completion of the training of the convolutional neural network model, it is feasible to respectively judge a layer from which the convolutional feature is extracted with a better calculated similarity effect, and then consider this layer as the selected convolutional layer.

After the convolutional layer is selected, it is feasible to, with respect to each detected target, first find a corresponding area of the target in the selected convolutional layer, then extract the convolutional feature corresponding to the area in a roi pooling manner, and normalize the extracted convolutional feature to obtain the feature vectors of the target.

How to find the corresponding area of the target in the selected convolutional layer and a specific implementation mode of the roi pooling all belong to the prior art.

4) Similarity Estimating Model

In the present embodiment, a similarity estimating model is obtained by training, and the similarity estimating model is used to calculate the similarity between feature vectors of different targets.

To this end, it is necessary to first obtain respective targets as the training data and corresponding feature vector. Reference may be made to the previous depictions for the obtaining manner.

Then, the similarity estimating model may be obtained by training according to a principle that the similarity between feature vectors from the same target is larger than similarity between feature vectors from different targets.

Preferably, the similarity estimating model may be:

$$\text{similarity}(x,z) = x^T \theta z,$$

wherein x and z respectively represent two feature vectors and satisfy $\|x\|=\|z\|=1$, $\theta$ represents a similarity parameter obtained from the training, and similarity(x,z) represents the similarity resulting from the calculation.

A procedure of training the above model is a learning process. A learning target is: regarding feature vectors x, y and z, wherein x and y are feature vectors from the same target, x and z are feature vectors from different targets, and then similarity(x,y)>similarity(x,z).

For example, target A respectively appears in two neighboring frames of images. Regarding the target A in the two frames of images, a feature vector may be obtained respectively, and the two feature vectors are feature vectors from the same target.

After training through massive training data, $\theta$ may separate feature vectors from the same target or different targets very well, thereby achieving a demand for characterizing the target similarity.

5) Similarity Calculation

It is feasible to, with respect to each detected target, calculate the similarity between the feature vectors of the target and feature vectors of each target in previous images according to the similarity estimating model obtained from the training, and then complete association of the same target between different image frames according to the calculation result, and allocate a tracking serial number.

For example, the following processing may be performed for each detected target: with respect to each frame of image I in continuous N frames of images obtained before the current image, respectively calculating the similarity between the feature vectors of the target and feature vectors in each detected target in the image I, N being a positive integer, whose specific value may depend on actual demands.

Then, it is feasible to generate a similarity matrix of respective targets according to the calculation result, use the similarity matrix of respective targets to find optimal allocation, and thereby allocate a serial number for each target. The specific implementation is of the prior art.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

To sum up, according to the solution of the above method embodiment, pre-training may be performed to obtain the convolutional neural network model and the similarity estimating model so that after the to-be-processed current image is obtained, the current image may be input into the convolutional neural network model to obtain the target detection result, then the feature vectors of respective detected targets may be respectively extracted from the pre-selected convolutional layer, and the similarity between the feature vectors of respective targets in the current image and feature vectors of targets in previous images according to the similarity estimating model is respectively calculated, thereby completing association of the same target between different image frames according to the calculation result, and allocating a tracking serial number. As compared with the prior art, in the solution of the method embodiment, the convolutional feature in the convolutional neural network is used as the feature of the target, the desired feature may be obtained correspondingly upon completion of the detection, thereby saving time spent in extracting the feature again, and simplifying operations of similarity calculation as matrix multiplication twice, thereby substantially improving the processing speed and thereby satisfying requirements for real-time processing in multiple targets-tracking. Tests show that regarding an image including 10 targets, time spent in tracking is only 3 ms and can completely satisfy requirements for real-time processing in multiple targets-tracking.

The above introduces the method embodiments. The solution of the present disclosure will be further described through an apparatus embodiment.

Figure 2:
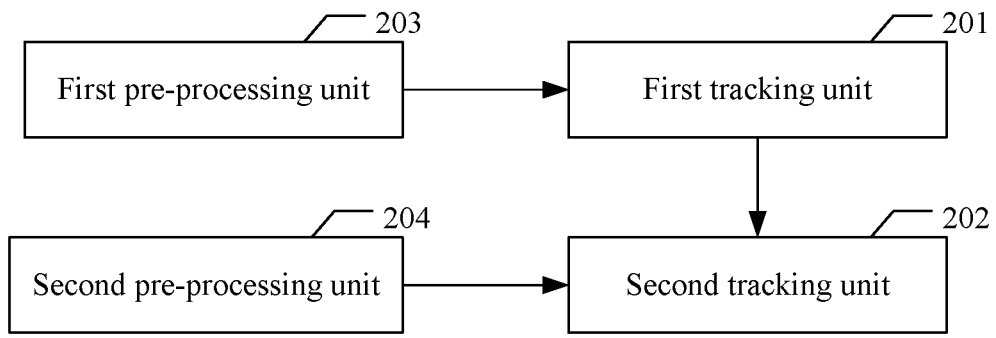
FIG. 2 is a structural schematic diagram of components of an embodiment of a multiple targets-tracking apparatus according to the present disclosure.

FIG. 2 is a structural schematic diagram of components of an embodiment of a multiple targets-tracking apparatus according to the present disclosure. As shown in FIG. 2, the apparatus comprises: a first tracking unit 201 and a second tracking unit 202.

The first tracking unit 201 is configured to obtain a to-be-processed current image, input the current image into a convolutional neural network model obtained by pre-training, and obtain a target detection result.

The second tracking unit 202 is configured to respectively extract feature vectors of each detected target from a pre-selected convolutional layer, respectively calculate a similarity between the feature vectors of each target in the current image and feature vectors of each target of previous images, complete association of the same target between different image frames according to calculation results, and allocate a tracking serial number.

It can be seen that to implement the above-mentioned solution, pre-training needs to be performed to obtain a convolutional neural network model so that after the to-be-processed current image is obtained, the convolutional neural network model may be used to perform target detection for the current image to thereby obtain the target detection result.

In addition, a similarity estimating model needs to be obtained by pre-training, to better estimate the similarity between different feature vectors.

Correspondingly, the apparatus shown in FIG. 2 may further comprise: a first pre-processing unit 203 and a second pre-processing unit 204.

The first pre-processing unit 203 obtains images as training data, and respectively obtains a notation result of each target in each frame of images as the training data, and obtains the convolutional neural network model by training according to images as the training data and the notation results of respective targets therein.

The second pre-processing unit 204 obtains respective targets as the training data and corresponding feature vector, and obtains the similarity estimating model by training according to a principle that the similarity between feature vectors from the same target is larger than similarity between feature vectors from different targets.

For example, the similarity estimating model may be:

$$\text{similarity}(x,z)=x^T\theta z,$$

wherein x and z respectively represent two feature vectors;

θ represents a similarity parameter obtained from the training;

similarity(x,z) represents the similarity resulting from the calculation.

Actual multiple targets-tracking may be performed after the training of the above two models is completed.

The first tracking unit 201 obtains the to-be-processed current image, inputs the current image into the convolutional neural network model, and obtains the target detection result.

The detection procedure based on the convolutional neural network model may be considered as a deep network first extracting features capable of better distinguishing targets, and then using these features to distinguish targets. Hence, each convolutional layer in the convolutional neural network may be considered as a feature, wherein the feature of a layer closer to the input image includes more information of the image itself, and the feature of a layer closer to an output result includes more abstract information.

The second tracking unit 202 respectively performs the following processing for each detected target: finding a corresponding area of the target in the selected convolutional layer; extracting a convolutional feature corresponding to the area in a roi pooling manner; normalizing the extracted convolutional feature to obtain the feature vectors of the target.

The feature vectors of each detected target may be obtained in the above manner.

Then, the second tracking unit 202 may, with respect to each detected target, calculate the similarity between the feature vectors of the target and feature vectors of each target in previous images according to the similarity estimating model.

Furthermore, the second tracking unit 202 may generate a similarity matrix of respective targets according to the calculation result, use the similarity matrix of respective targets to find optimal allocation, and thereby allocate a serial number for each target. The specific implementation is of the prior art.

Reference may be made to corresponding depictions in the aforesaid method embodiment for a specific workflow of the apparatus embodiment shown in FIG. 2. The workflow is not detailed any more.

To sum up, according to the solution of the above apparatus embodiment, pre-training may be performed to obtain the convolutional neural network model and the similarity estimating model so that after the to-be-processed current image is obtained, the current image may be input into the convolutional neural network model to obtain the target detection result, then the feature vectors of respective detected targets may be respectively extracted from the pre-selected convolutional layer, and the similarity between the feature vectors of respective targets in the current image and feature vectors of targets in previous images according to the similarity estimating model is respectively calculated, thereby completing association of the same target between different image frames according to the calculation result, and allocating a tracking serial number. As compared with the prior art, in the solution of the apparatus embodiment, the convolutional feature in the convolutional neural network is used as the feature of the target, the desired feature may be obtained correspondingly upon completion of the detection, thereby saving time spent in extracting the feature again, and simplifying operations of similarity calculation as matrix multiplication twice, thereby substantially improving the processing speed and thereby satisfying requirements for real-time processing in multiple targets-tracking. Tests show that regarding an image including 10 targets, time spent in tracking is only 3 ms and can completely satisfy requirements for real-time processing in multiple targets-tracking.

Figure 3:
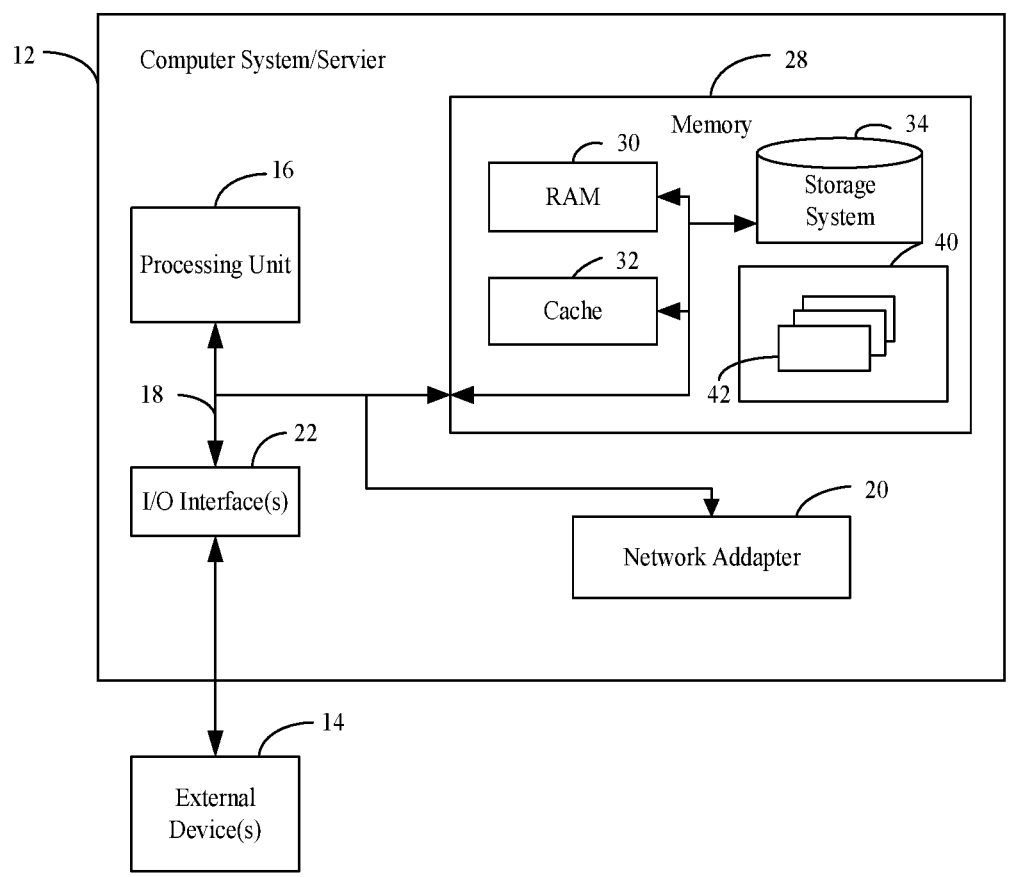
FIG. 3 illustrates a block diagram of an example computer system/server 12 adapted to implement an implementation mode of the present disclosure.

FIG. 3 illustrates a block diagram of an example computer system/server 12 adapted to implement an implementation mode of the present disclosure. The computer system/server 12 shown in FIG. 3 is only an example and should not bring about any limitation to the function and scope of use of the embodiments of the present disclosure.

As shown in FIG. 3, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 3 and typically called a "hard drive"). Although not shown in FIG. 3, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 3, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the method in the embodiments shown in FIG. 1, namely, obtaining a to-be-processed current image, inputting the current image into a convolutional neural network model obtained by pre-training, and obtaining a target detection result; respectively extracting feature vectors of each detected target from a pre-selected convolutional layer; respectively calculating a similarity between the feature vectors of each target in the current image and feature vectors of each target of previous images, completing association of the same target between different image frames according to calculation results, and allocating a tracking serial number.

Reference may be made to related depictions in the above embodiments for specific implementations, which will not be detailed any more.

The present disclosure meanwhile provides a computer-readable storage medium on which a computer program is stored, the program, when executed by the processor, implementing the method stated in the embodiment shown in FIG. 1.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electro-magnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A multiple targets-tracking method, comprising:
obtaining a to-be-processed current image, inputting the current image into a convolutional neural network model obtained by pre-training, to perform detection of multiple targets;
respectively extracting a feature vector of each detected target from features of the current image generated by a pre-selected convolutional layer of the convolutional neural network model during the detection of multiple targets; and
respectively calculating a similarity between the feature vector of each target in current image and a feature vector of each target in previous images, completing association of the same target between different image frames according to calculation results, and allocating a same tracking serial number to the same target between different image frames.

2. The method according to claim 1, wherein
the obtaining a to-be-processed current image, inputting the current image into a convolutional neural network model obtained by pre-training, to perform detection of multiple targets further comprises:
obtaining images as training data, and respectively obtaining a notation result of each target in each frame of images as the training data;
obtaining the convolutional neural network model by training according to the images as the training data and the notation results of each target therein.

3. The method according to claim 1, wherein
the respectively extracting the feature vector of each detected target from features of the current image generated by a pre-selected convolutional layer comprises:
respectively performing the following processing for each detected target:
finding a corresponding area of the target in the selected convolutional layer;
extracting convolutional features corresponding to the area in a roi pooling manner;
normalizing the extracted convolutional features to obtain the feature vector of the target.

4. The method according to claim 1, wherein
the respectively calculating a similarity between the feature vector of each target in current image and the feature vector of each target in previous images comprises:
with respect to each detected target, respectively calculating the similarity between the feature vector of the target and the feature vector of each target in previous images according to a similarity estimating model obtained by pre-training.

5. The method according to claim 4, wherein
before obtaining a to-be-processed current image, inputting the current image into a convolutional neural network model obtained by pre-training, to perform detection of multiple targets, the method further comprises:
obtaining each target as the training data and corresponding feature vectors; and
obtaining the similarity estimating model by training according to a principle that a similarity between feature vectors from the same target is larger than a similarity between feature vectors from different targets.

6. The method according to claim 5, wherein the similarity estimating model is:

$$similarity(x,z)=x^T \theta z,$$

wherein x and z respectively represent two feature vectors;

$x^T$ is the transpose of x;

θ represents a similarity parameter obtained from the training;

similarity(x,z) represents the similarity resulting from the calculation.

7. A computer device, comprising a memory, a processor and a computer program which is stored on the memory and runs on the processor, wherein the processor, upon executing the program, implements the following operation:
obtaining a to-be-processed current image, inputting the current image into a convolutional neural network model obtained by pre-training, to perform detection of multiple targets;
respectively extracting a feature vector of each detected target from features of the current image generated by a pre-selected convolutional layer of the convolutional neural network model during the detection of multiple targets; and
respectively calculating a similarity between the feature vectors of each target in current image and a feature vector of each target in previous images, completing association of the same target between different image frames according to calculation results, and allocating a same tracking serial number to the same target between different image frames.

8. The computer device according to claim 7, wherein the obtaining a to-be-processed current image, inputting the current image into a convolutional neural network model obtained by pre-training, to perform detection of multiple targets further comprises:
obtaining images as training data, and respectively obtaining a notation result of each target in each frame of images as the training data; and
obtaining the convolutional neural network model by training according to the images as the training data and the notation results of each target therein.

9. The computer device according to claim 7, wherein the respectively extracting the feature vectors of each detected target from features of the current image generated by a pre-selected convolutional layer comprises:
respectively performing the following processing for each detected target:
finding a corresponding area of the target in the selected convolutional layer;
extracting convolutional features corresponding to the area in a roi pooling manner; and
normalizing the extracted convolutional features to obtain the feature vector of the target.

10. The computer device according to claim 7, wherein the respectively calculating a similarity between the feature vector of each target in current image and the feature vectors of each target in previous images comprises:
with respect to each detected target, respectively calculating the similarity between the feature vector of the target and the feature vector of each target in previous images according to a similarity estimating model obtained by pre-training.

11. The computer device according to claim 10, wherein before obtaining a to-be-processed current image, inputting the current image into a convolutional neural network model obtained by pre-training, to perform detection of multiple targets, the operation further comprises:
obtaining each target as the training data and corresponding feature vectors; and
obtaining the similarity estimating model by training according to a principle that a similarity between feature vectors from the same target is larger than a similarity between feature vectors from different targets.

12. The computer device according to claim 11, wherein the similarity estimating model is:

$$similarity(x,z)=x^T \theta z,$$

wherein x and z respectively represent two feature vectors;

$x^T$ is the transpose of x;

θ represents a similarity parameter obtained from the training;

similarity(x,z) represents the similarity resulting from the calculation.

13. A non-transitory computer-readable storage medium on which a computer program is stored, wherein the program, when executed by a processor, implements the following operation:
obtaining a to-be-processed current image, inputting the current image into a convolutional neural network model obtained by pre-training, to perform detection of multiple targets;
respectively extracting a feature vectors of each detected target from features of the current image generated by a pre-selected convolutional layer of the convolutional neural network model during the detection of multiple targets; and
respectively calculating a similarity between the feature vectors of each target in current image and a feature vectors of each target in previous images, completing association of the same target between different image frames according to calculation results, and allocating a same tracking serial number to the same target between different image frames.

14. The non-transitory computer-readable storage medium according to claim 13, wherein
the obtaining a to-be-processed current image, inputting the current image into a convolutional neural network model obtained by pre-training, to perform detection of multiple targets further comprises:
obtaining images as training data, and respectively obtaining a notation result of each target in each frame of images as the training data; and
obtaining the convolutional neural network model by training according to the images as the training data and the notation results of each target therein.

15. The non-transitory computer-readable storage medium according to claim 13, wherein
the respectively extracting the feature vector of each detected target from features of the current image generated by a pre-selected convolutional layer comprises:
respectively performing the following processing for each detected target:

finding a corresponding area of the target in the selected convolutional layer;

extracting convolutional features corresponding to the area in a roi pooling manner; and normalizing the extracted convolutional features to obtain the feature vector of the target.

16. The non-transitory computer-readable storage medium according to claim 13, wherein the respectively calculating a similarity between the feature vector of each target in current image and the feature vector of each target in previous images comprises:

with respect to each detected target, respectively calculating the similarity between the feature vectors of the target and the feature vectors of each target in previous images according to a similarity estimating model obtained by pre-training.

17. The non-transitory computer-readable storage medium according to claim 16, wherein before obtaining a to-be-processed current image, inputting the current image into a convolutional neural network model obtained by pre-training, to perform detection of multiple targets, the operation further comprises:

obtaining each target as the training data and corresponding feature vectors; and obtaining the similarity estimating model by training according to a principle that a similarity between feature vectors from the same target is larger than a similarity between feature vectors from different targets.

18. The non-transitory computer-readable storage medium according to claim 17, wherein the similarity estimating model is:

$$similarity(x,z)=x^T\theta z,$$

wherein x and z respectively represent two feature vectors;

$x^T$ is the transpose of x;

θ represents a similarity parameter obtained from the training;

similarity(x,z) represents the similarity resulting from the calculation.

\* \* \* \* \*

UNITED STATES PATENT AND TRADEMARK OFFICE
CERTIFICATE OF CORRECTION

PATENT NO. : 10,810,748 B2
APPLICATION NO. : 16/012569
DATED : October 20, 2020
INVENTOR(S) : Han Gao et al.

It is certified that error appears in the above-identified patent and that said Letters Patent is hereby corrected as shown below:

In the Claims

Column 13, Lines 30-31, Claim 7:
After "similarity between the feature"
Delete "vectors" and
Insert -- vector --.

Column 14, Lines 41-42, Claim 13:
After "similarity between the feature"
Delete "vectors" and
Insert -- vector --.

Column 14, Lines 42-43, Claim 13:
After "in current image and a feature"
Delete "vectors" and
Insert -- vector --.

Column 15, Line 15, Claim 16:
After "similarity between the feature"
Delete "vectors" and
Insert -- vector --.

Column 15, Lines 15-16, Claim 16:
After "of the target and the feature"
Delete "vectors" and
Insert -- vector --.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*